(12) United States Patent
Kozak

(10) Patent No.: US 7,530,771 B2
(45) Date of Patent: May 12, 2009

(54) NON-FERROUS BIT FOR USE WITH A MAGNETIC CHUCK

(76) Inventor: Burton Kozak, 1300 N. Lake Shore Dr., #28C, Chicago, IL (US) 60610

( * ) Notice: Subject to any disclaimer, the term of this patent is extended or adjusted under 35 U.S.C. 154(b) by 0 days.

(21) Appl. No.: 11/528,725

(22) Filed: Sep. 27, 2006

(65) Prior Publication Data

US 2008/0075549 A1 Mar. 27, 2008

(51) Int. Cl.
*B23B 31/28* (2006.01)
*B23B 51/02* (2006.01)

(52) U.S. Cl. .................. 408/226; 408/239 A; 279/128; 81/438; 81/900

(58) Field of Classification Search ............. 408/1 R, 408/226, 239 A; 279/128, 143; 81/900, 81/438, 185, DIG. 11
See application file for complete search history.

(56) References Cited

U.S. PATENT DOCUMENTS

| 2,260,055 | A | * | 10/1941 | Reardon | 81/451 |
| 2,471,764 | A | | 5/1949 | Miller et al. | |
| 2,782,822 | A | * | 2/1957 | Clark | 81/451 |
| 2,808,862 | A | * | 10/1957 | Simkins | 81/442 |
| 2,828,131 | A | * | 3/1958 | Appleby | 279/16 |
| 2,838,082 | A | * | 6/1958 | Lange | 81/438 |
| 3,392,767 | A | * | 7/1968 | Stillwagon, Jr. | 81/451 |
| 3,616,827 | A | * | 11/1971 | Stillwagon, Jr. | 81/436 |
| 3,707,894 | A | * | 1/1973 | Stillwagon, Jr. | 81/125 |
| 3,970,407 | A | * | 7/1976 | Uffman | 408/204 |
| 4,448,097 | A | | 5/1984 | Rocca | |
| 4,514,117 | A | * | 4/1985 | Scott | 408/239 R |
| 4,995,768 | A | * | 2/1991 | Craft | 408/239 A |
| 5,259,277 | A | * | 11/1993 | Zurbuchen | 81/177.1 |
| 5,577,426 | A | * | 11/1996 | Eggert et al. | 81/439 |
| 5,586,847 | A | * | 12/1996 | Mattern et al. | 408/239 A |
| 5,724,873 | A | * | 3/1998 | Hillinger | 81/451 |
| 5,878,637 | A | * | 3/1999 | Liu | 81/451 |
| 6,179,532 | B1 | * | 1/2001 | Oldham | 409/132 |
| 6,321,626 | B1 | * | 11/2001 | Liu | 81/451 |
| 6,505,530 | B2 | * | 1/2003 | Adler et al. | 81/9.22 |
| 6,609,862 | B2 | * | 8/2003 | Mowins | 408/226 |
| 6,655,240 | B1 | * | 12/2003 | DeVecchis et al. | 81/438 |
| 6,666,115 | B2 | * | 12/2003 | Liu | 81/451 |
| 7,000,509 | B2 | | 2/2006 | Shiao | |
| 7,051,630 | B2 | * | 5/2006 | Lee | 81/451 |
| 7,162,802 | B2 | * | 1/2007 | Benardeau et al. | 30/147 |
| 2005/0186043 | A1 | * | 8/2005 | Fuller | 408/239 R |
| 2007/0127994 | A1 | * | 6/2007 | Welker | 408/226 |

FOREIGN PATENT DOCUMENTS

JP 56003185 A * 1/1981
WO WO 2004082893 A1 * 9/2004

* cited by examiner

*Primary Examiner*—David P Bryant
*Assistant Examiner*—Eric A Gates

(57) ABSTRACT

A device that allows the use of tool- and drill-bits in conjunction with a magnetic chuck comprises ferromagnetic material or a permanent magnet that is attached to the bit.

18 Claims, 3 Drawing Sheets

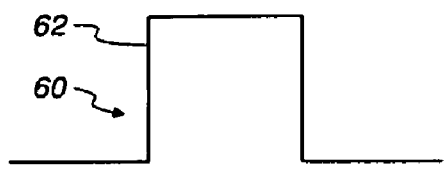
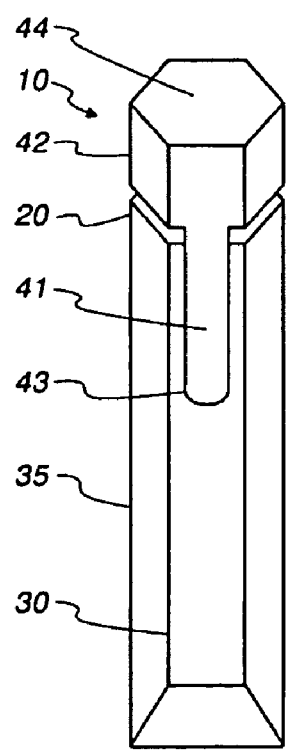
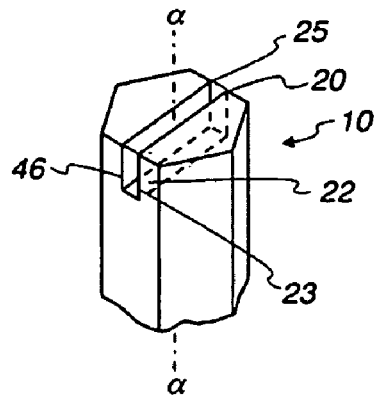
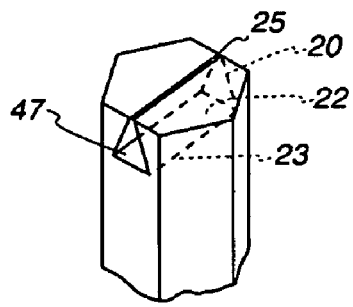
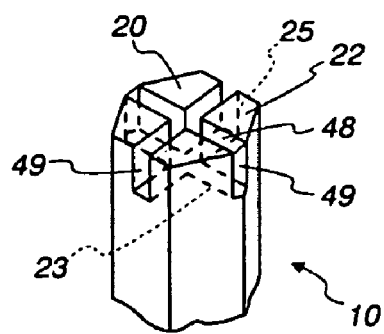

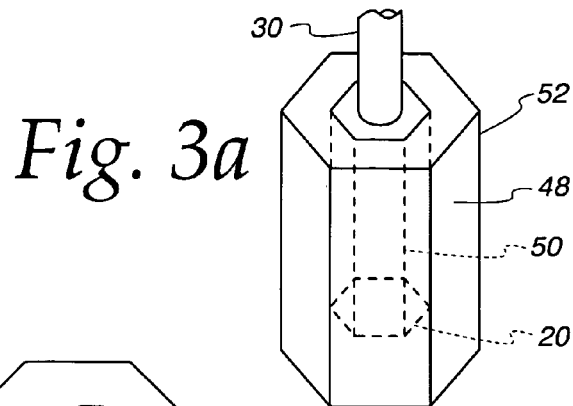
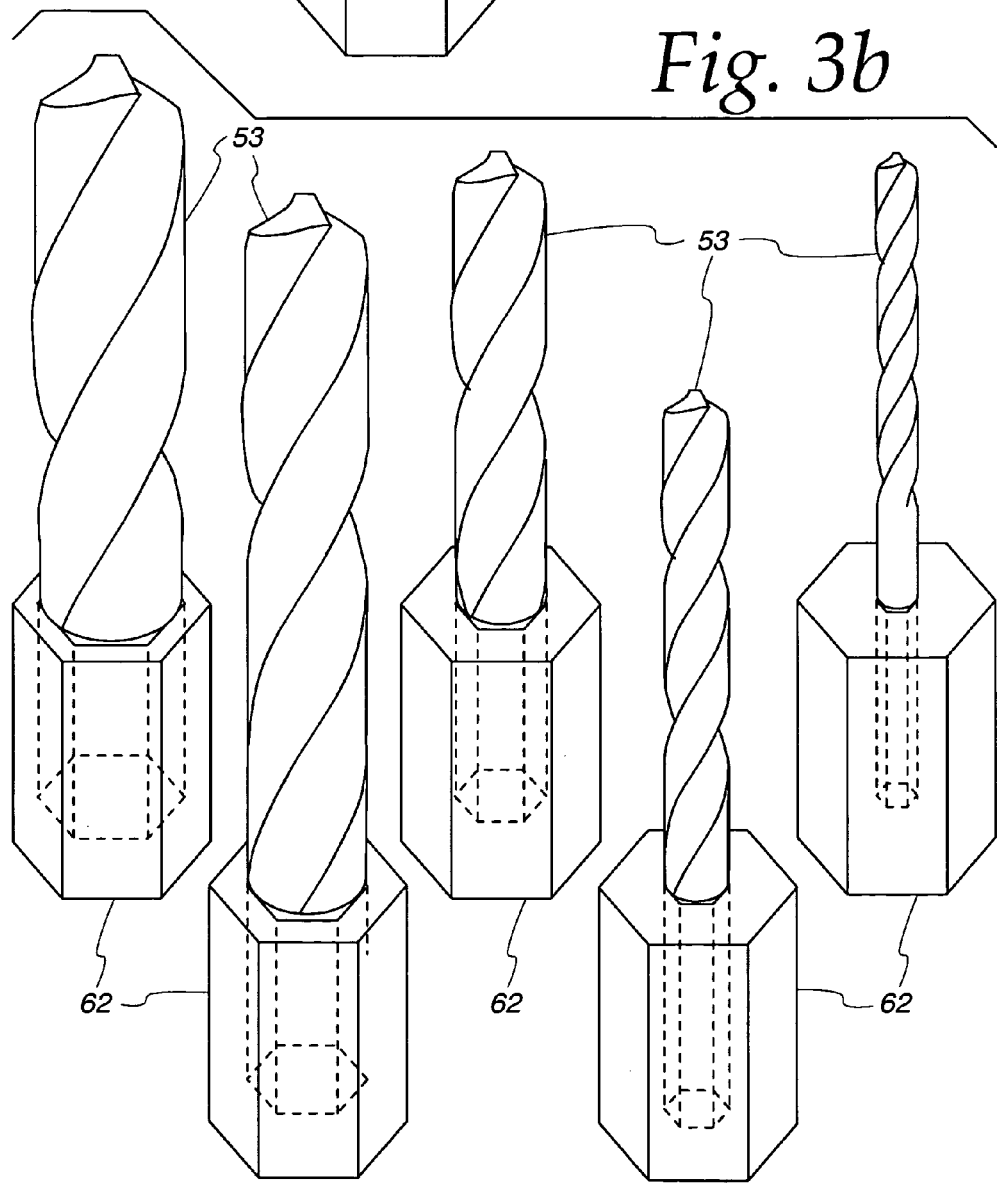

NON-FERROUS BIT FOR USE WITH A MAGNETIC CHUCK

BACKGROUND OF THE INVENTION

1. Field of the Invention

This invention relates to the field of tool- and drill-bits and, more particularly, this invention relates to bits adapted for use with a magnetic chuck.

2. Background of the Invention

Iron bits can be used with a magnetic chuck. But such bits are ill-suited when certain properties concerning hardness, resistance to corrosion, or tolerance to high temperatures are required. For these situations carbide, zinc, and stainless steel are much preferable. Yet presently, such bits cannot take advantage of devices which have magnetic chucks. Magnetic chucks present many advantages, especially quick bit engagement and release.

Magnetic means for securing driver-bits are described in several U.S. patents. For instance, U.S. Pat. No. 2,471,764 to Miller et al. (Jan. 31, 1946) discloses a driver tool wherein driver bits and other objects are magnetically confined in tubes that are attached to a handle.

U.S. Patent to Rocca (May 15, 1984) discloses a driver tool with a similar construction.

U.S. Pat. No. 6,666,115 to Liu (Dec. 23, 2003) discloses a driver tool with a magnetic chuck.

U.S. Pat. No. 7,000,509 to Shiao (Feb. 21, 2006) discloses a driver tool wherein a plurality of driver bits are magnetically confined in a cassette comprising a plurality of angularly disposed storage chambers. In all of these inventions, the bits magnetically confined are limited to ferrous bits.

A need exists in the art for non-ferrous bits that can be utilized in conjunction with a magnetic chuck and for a method that would modify non-ferrous bits so that they can be utilized in conjunction with magnetic chucks. The method should enable the magnetic utilization of items containing non-ferrous materials and the utilization of popular non-ferrous materials, such as zinc and carbides, for use as magnetic drill bits, screw-driver tips, sockets, and other fastener engagement tools.

SUMMARY OF THE INVENTION

An object of this invention is to provide a magnetizable component for a non-ferrous bit and a method for magnetizing a component of non-ferrous bit that overcome many of the disadvantages of the prior art.

Another object of the present invention is to present invention is to provide a non-ferrous bit that responds to a magnetic force. A feature of this invention is a component attached to the bit that is magnetizable. An advantage of this invention is that it allows an operator to use a magnetic chuck with such a bit.

Yet another object of this invention is to provide a method for the manufacture of non-ferrous bits which ultimately can be used with a magnetic chuck. A feature of this invention is that the method can be applied to a wide variety of non-ferrous bits. An advantage of this invention is that it allows the use of non-ferrous bits that have especially desirable properties in conjunction with a magnetic chuck.

In brief, this invention provides attachments to non-ferrous bits so that they can be utilized in conjunction with a magnetic chuck.

Also provided is a method for modifying non-ferrous bits so that they can be utilized in conjunction with magnetic chucks. The materials utilized would be strongly attracted in a magnetic field, i.e materials with a strong magnetization, either inherent (permanent magnets) or induced (ferromagnetic materials).

BRIEF DESCRIPTION OF THE DRAWING

The foregoing and other objects, aspects and advantages of this invention will be better understood from the following detailed description of the preferred embodiments of the invention with reference to the drawing, in which:

FIG. 1 is an overall schematic profile view of an exemplary embodiment of a non-ferrous bit that can be utilized in conjunction with a magnetic chuck, in accordance with features of this invention;

FIG. 2a is a schematic view of an alternative exemplary embodiment of a non-ferrous bit that can be utilized in conjunction with a magnetic chuck, in accordance with features of this invention;

FIG. 2b is a schematic view of an alternative exemplary embodiment of a non-ferrous bit that can be utilized in conjunction with a magnetic chuck, in accordance with features of this invention;

FIG. 2c is a schematic view of an alternative exemplary embodiment of a non-ferrous bit that can be utilized in conjunction with a magnetic chuck, in accordance with features of this invention;

FIG. 3a is a schematic profile view of another alternative exemplary embodiment of a non-ferrous bit that can be utilized in conjunction with a magnetic chuck, in accordance with features of this invention;

FIG. 3b is a schematic view of a plurality of non-ferrous bits that can be utilized in conjunction with a magnetic chuck, in accordance with features of this invention;

DETAILED DESCRIPTION OF THE INVENTION

Figure 4A:
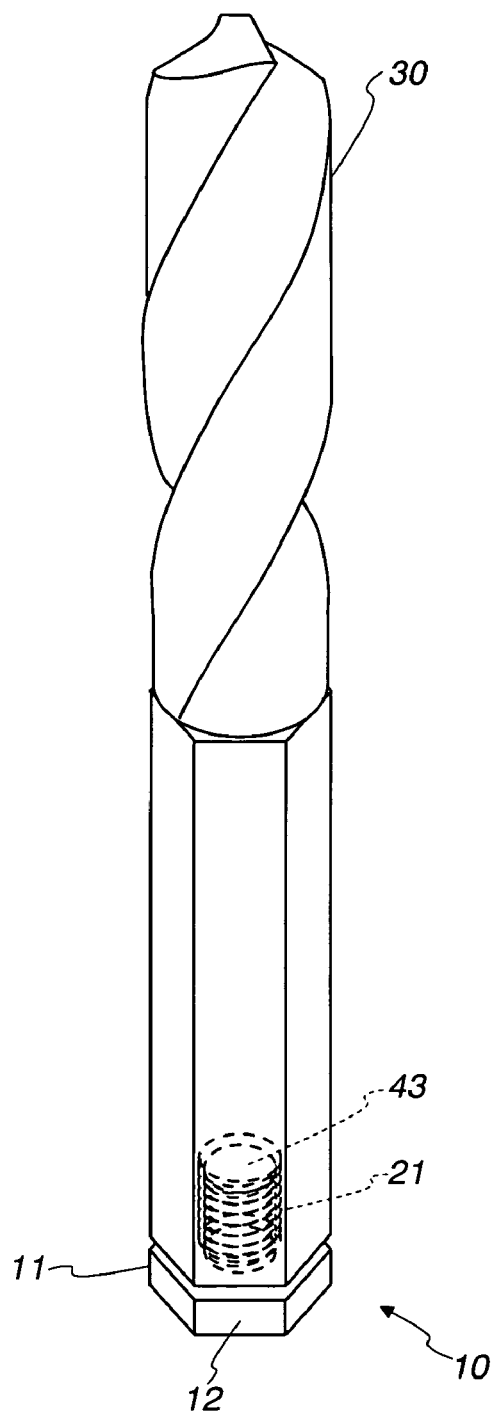
FIG. 4a is a schematic profile view of an exemplary embodiment of an attachment for a non-ferrous bit that can be utilized in conjunction with a magnetic chuck, in accordance with features of this invention.

This invention provides a device attached to a non-ferrous bit allowing that bit to be used in conjunction with a magnetic chuck. Also, this invention provides a method for adapting non-ferrous bits for use with a magnetic chuck. The invented device comprises material that is attracted by a magnetic field, i.e. material with a strong magnetization. Thus, the material is either a permanent magnet or ferrous material in which magnetization is induced when it is placed in close spatial relationship to a magnetic field so as to contact the lines of flux of the field. Where the material is a permanent magnet, the lines of magnetic flux extend substantially along a longitudinal axis of the bit.

FIG. 1 is an overall schematic profile view of an exemplary embodiment of the invention. In this embodiment, the invented device resembles a nail. As depicted in FIG. 1, the invented device 10 is attached at a first end or heel 20 of a bit 30. The invented device 10 comprises an elongated shank 41 terminating at a first end as a radially extending head 42. The shank and head may comprise ferrous material, (i.e. material that acquires a magnetization when exposed to a magnetic field), or may constitute a permanent magnet. In either case, a second end or tip 43 of the shank constitutes a magnetic pole (say a South magnetic pole) while an outwardly and axially facing surface 44 of the head 42 constitutes a magnetic pole of the opposite polarity. The device 10 is adapted to come into direct contact with the magnet(s) in a magnetic chuck when a device-bearing bit is inserted in such a chuck.

The device 10 can be inserted in a drill bit, a tool bit or some other fastener engaging device. Typically, the bit 30 comprises a cylindrically shaped body 35 (such as a shaft) or some other bulk configuration adapted to receive the device. A proximal end 20 of the bit defines a heel defining either a circular or a non-circular (e.g. polygonal) cross-section. In FIG. 1, the device 10 is shown positioned coaxially within the body 35 of the bit 30 such that a periphery of the radially-extending head section 42 is substantially flush with longitudinally extending regions of the body 35 of the bit head. Where the bit 30 is massive enough, one may dispense with the head 42, and have an insert comprising only a shank 41. This embodiment can be manufactured at a comparatively low cost, with an axial cavity being first bored in the bit and then filled with a molten ferrous material.

The proximal end 20 of the bit is received in a magnetic chuck 60 which forms a socket 62. This chuck may comprise a permanent magnet or a magnetizable material wherein magnetization is induced by an electric current, or by a current carrying coil. The chuck may also comprise a ball detente mechanism, in which case the body 35 of the bit comprises a groove (not shown) adapted to be engaged by the ball detente mechanism. Where the body 35 has a circular cross-section, the body surface may be knurled or may comprise wings projecting radially therefrom.

FIG. 2a illustrates another embodiment wherein the invented device 10 comprises a rectangular slab 46. Optionally the device may comprise a head (not shown) analogous to the head 42 on the device shown in FIG. 1. The slab 46 slidably communicates with a region of the bit defining a complimentary-shaped channel 22. In this embodiment, the channel defines surfaces which extend both axially and radially relative to the longitudinal axis a of the body 35 A distal end 23 of the channel is closed while a proximal end 25 is open and forms an aperture with the proximal end 20 of the bit. This embodiment can also be manufactured at a very low cost as the device can be press fit into the channel. This embodiment can be modified using inserts of a variety of shapes.

FIG. 2b illustrates one such variation wherein the invented device 10 comprises a wedge-shaped insert 47. Again, optionally the device may comprise a head (not shown) analogous to the head 42 on the device shown in FIG. 1. The wedge 47 slidably communicates with a region of the bit forming a radially extending channel 22 whereby the channel is open at either or both its ends so as to define apertures in the exterior surfaces of the body. This will enable the device to slidably communicate with the body in a direction generally perpendicular to the longitudinal axis α. A distal end 23 of the channel is closed while a proximal end 25 is open and forms an aperture with the proximal end 20 of the bit. This wedge-shaped embodiment has the advantage that there is little likelihood that the insert would be extruded by an axially-directed magnetic force.

Alternatively, the channel 22 can extend axially, so that the body 35 slidably receives the device 10 in a direction parallel to the longitudinal axis α.

FIG. 2c illustrates yet another variation wherein the invented device 10 comprises an x-shaped insert 48. Again, optionally the device may comprise a head (not shown) analogous to the head 42 on the device shown in FIG. 1. The x-shape insert comprises two intersecting slabs 49. The device slidably communicates with a region of the bit forming an x-shaped axially extruding channel 22. A distal end 23 of the channel is closed while a proximal end 25 is open and forms an aperture with the proximal end 20 of the bit. This x-shaped embodiment offers a relatively large mass of magnetic material with little effect on the structural integrity of the bit.

Figure 4B:
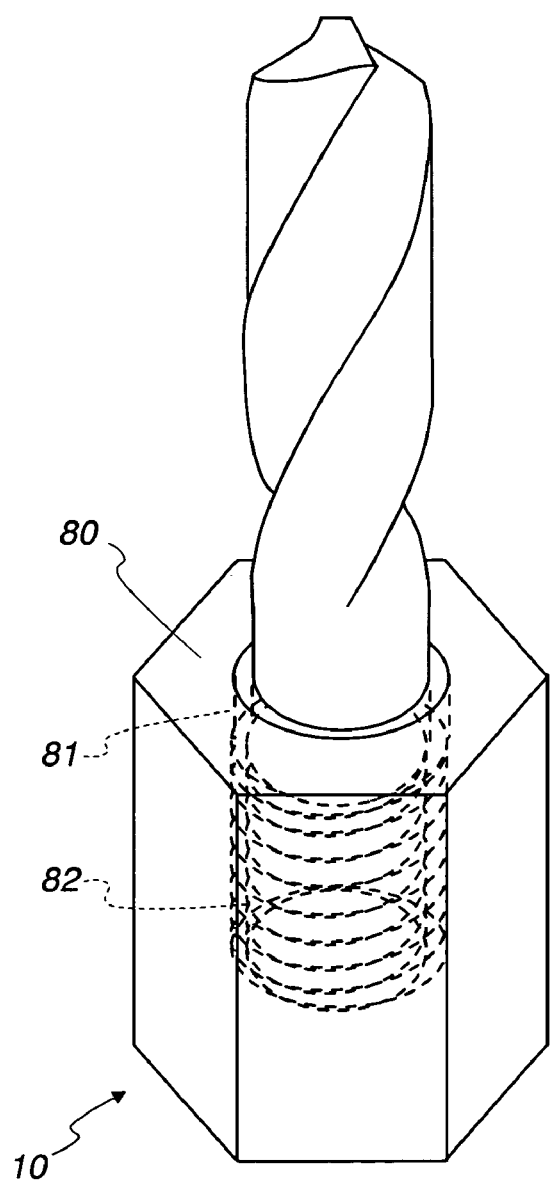
FIG. 4b is a schematic profile view of another exemplary embodiment of an attachment for a non-ferrous bit that can be utilized in conjunction with a magnetic chuck, in accordance with features of this invention.

FIG. 3a illustrates yet another embodiment wherein the invented device comprises a cylindrical sleeve 48 adapted to slidably receive the bit 30. The heel 20 of the bit 30 has been inserted such that the longitudinal axis of the bit is coaxially arranged with the sleeve 48. The sleeve 48 defines an inner surface 50 that matches the cross-section of the bit 30 and an outer surface 52 that matches the cross-section of a socket 62 and/or of the magnetic chuck 60. As long as the cross-sections are non-circular, this allows for torque to be applied from the chuck or socket, which is engaging the outer surface 52 of the sleeve, to the bit 30. In the alternative, as depicted in FIG. 4b, the heel 20 may comprise a section with a male thread adapted to be received in a cavity with a matching female thread.

The embodiment depicted in FIG. 3a has the advantage that one can have a plurality of bits 30, each with a different cross-section, that are all inserted in sleeves with complimentary cross-sections. An outer surface 52 of the sleeve defines a typical topography (e.g. a standard size ¼ inch hex). Depicted in FIG. 3b, is a set of different-size drill bits that form a set 53 that can all be received in the same socket 62 of a magnetic chuck 60. This allows for very fast bit interchange and optimization of use of impact drivers many of which feature a certain size chuck aperture. Similarly one can have a set of different headed (Phillips, Allen, etc . . . ) tool-bits Fabrication Details.

A variety of means may be employed to attach the invented device 10 to a bit or to a shaft. For all three of the embodiments described in FIGS. 1, 2, and 3, the attachment may be effected by integrally molding the device to the end of the bit. Alternatively, for these and other embodiments, a reversible attachment may be effected, and by a variety of means. For instance, FIG. 4a depicts an arrangement where the inserted device 10 constitutes a screw 11, with a head 12 (or without) and a threaded shank 43. The threaded shank 43 is received in either an axially-extending or radially-extending (latter not shown) threaded bore 21 in a bit 30. Similarly, in the sleeve embodiment depicted in FIG. 3a and where the bit 30 is a right-handed drill bit, a possible arrangement is depicted in FIG. 4b where the drill bit heel 80 has a right-hand threaded portion 81 and the sleeve a matching threaded bore 82. Alternatively a reversible attachment may be effected by means of a ball-detente mechanism or set screw.

Permanent magnets fabricated using a variety of metals, e.g. Neodymium or Iron, and compounds, e.g. Alnico, Mumetal (an alloy of ca. 25% iron, 75% nickel, and small proportions of other elements) and compounds of rare earth elements, including Samarium-Cobalt and Neodymium-Iron-Boron (NIB) are available commercially in sizes and configurations suitable for all of the embodiments described supra.

Ferromagnetic materials include Nickel, Cobalt, iron, and a variety of compounds and alloys.

Finally, the invented magnetic insert adapted to be received in a shaft can be used in conjunction not only with metallic shafts but also with shafts fabricated from a broad variety of materials including, but not limited to, plastics, nylon, fiberglass, ceramics, etc . . . Also, the invented insert may be used in conjunction with a myriad other implements in addition to shafts.

While the invention has been described in the foregoing with reference to details of the illustrated embodiments, these details are not intended to limit the scope of the invention as defined in the appended claims.

The embodiment of the invention in which an exclusive property or privilege is claimed is defined as follows:

1. A tool bit for association with a magnetic tool chuck, the tool bit comprising:
    a first region constructed from a non-ferrous material and the first region having a portion with a cross section;
    a second region constructed, at least in part, from a ferrous material for magnetic cooperation with the magnetic tool chuck and the second region having an inner surface with a cross section configured complementary to the cross section of the portion of the first region;
    wherein the second region receives the first region; and,
    wherein the cross section of the portion of the first region and the cross section of the inner surface of the second region are hexagonal.

2. The tool bit of claim 1, wherein at least a portion of the first region is slidably received in a portion of the second region.

3. The tool bit of claim 2, wherein the second region is coaxial with the first region.

4. The tool bit of claim 3, wherein the second region has an outer surface with at least portion of the outer surface having a hexagonal configuration.

5. The tool bit of claim 1, wherein the second region includes a channel for receiving the first region.

6. The tool bit of claim 1, wherein the first region is integrally molded in the second region.

7. The tool bit of claim 1 wherein the first region and second region are coaxial.

8. The tool bit of claim 1 wherein the first region comprises a drill bit.

9. The tool bit of claim 1 wherein the first region comprises a screw-driver tip.

10. A tool bit for association with a magnetic tool chuck, the tool bit comprising: a first region constructed from a non-ferrous material and the first region having a portion with a cross section; a second region constructed, at least in part, from a ferrous material for magnetic cooperation with the magnetic tool chuck and the second region having an inner surface with a cross section configured complementary to the cross section of the portion of the first region; wherein the second region receives the first region; and, wherein the cross section of the portion of the first region and the cross section of the inner surface of the second region are threaded.

11. The tool bit of claim 10, wherein at least a portion of the first region is slidably received in a portion of the second region.

12. The tool bit of claim 10, wherein the second region is coaxial with the first region.

13. The tool bit of claim 10, wherein the second region has an outer surface with at least portion of the outer surface having a hexagonal configuration.

14. The tool bit of claim 10 wherein the first region comprises a drill bit.

15. The tool bit of claim 10 wherein the first region comprises a screw-driver tip.

16. A tool bit for association with a magnetic tool chuck, the tool bit comprising: a first region constructed from a non-ferrous material and the first region having a portion with a cross section; a second region constructed, at least in part, from a ferrous material for magnetic cooperation with the magnetic tool chuck and the second region having an outer surface with a cross section configured complementary to the cross section of the portion of the first region; wherein the first region receives the second region; and, wherein the first region further comprises a threaded bore and the second region further comprises a head with a threaded shank configured complimentary to the threaded bore.

17. The tool bit of claim 16 wherein the first region comprises a drill bit.

18. The tool bit of claim 16 wherein the first region comprises a screw-driver tip.

* * * * *